United States Patent
Basir

(10) Patent No.: US 7,689,253 B2
(45) Date of Patent: Mar. 30, 2010

(54) VEHICLE IMMERSIVE COMMUNICATION SYSTEM

(75) Inventor: Otman A. Basir, Waterloo (CA)

(73) Assignee: E-Lane Systems, Inc., Waterloo, Ontario (CA)

( * ) Notice: Subject to any disclaimer, the term of this patent is extended or adjusted under 35 U.S.C. 154(b) by 878 days.

(21) Appl. No.: 11/452,117

(22) Filed: Jun. 13, 2006

(65) Prior Publication Data

US 2007/0042812 A1 Feb. 22, 2007

Related U.S. Application Data

(60) Provisional application No. 60/689,959, filed on Jun. 13, 2005, provisional application No. 60/729,905, filed on Oct. 25, 2005, provisional application No. 60/736,102, filed on Nov. 10, 2005, provisional application No. 60/763,660, filed on Jan. 31, 2006, provisional application No. 60/777,424, filed on Feb. 28, 2006, provisional application No. 60/803,329, filed on May 26, 2006.

(51) Int. Cl.
*H04M 3/42* (2006.01)
*H04B 1/38* (2006.01)

(52) U.S. Cl. .................. 455/563; 455/414.1; 455/569.1

(58) Field of Classification Search ................. 455/563, 455/414.1, 415, 569.2, 569.1, 553.1; 709/206
See application file for complete search history.

(56) References Cited

U.S. PATENT DOCUMENTS

| 6,690,268 | B2 | 2/2004 | Schofield et al. |
| 6,697,638 | B1* | 2/2004 | Larsson et al. ........... 455/553.1 |
| 6,714,223 | B2 | 3/2004 | Asami et al. |
| 6,812,888 | B2 | 11/2004 | Drury et al. |
| 6,895,310 | B1 | 5/2005 | Kolls |
| 6,944,679 | B2 | 9/2005 | Parupudi et al. |
| 6,968,272 | B2 | 11/2005 | Knockeart et al. |
| 6,970,703 | B2 | 11/2005 | Fuchs et al. |
| 6,970,783 | B2 | 11/2005 | Knockeart et al. |
| 7,286,857 | B1* | 10/2007 | Walker et al. ............. 455/569.2 |
| 7,289,796 | B2* | 10/2007 | Kudoh ........................ 455/415 |
| 7,346,374 | B2* | 3/2008 | Witkowski et al. ........ 455/569.2 |
| 2004/0090950 | A1 | 5/2004 | Lauber et al. |
| 2004/0145457 | A1 | 7/2004 | Schofield et al. |
| 2004/0193420 | A1 | 9/2004 | Kennewick et al. |
| 2005/0046584 | A1 | 3/2005 | Breed |
| 2005/0054386 | A1* | 3/2005 | Chung ...................... 455/569.1 |
| 2005/0130631 | A1* | 6/2005 | Maguire et al. ........... 455/414.1 |

(Continued)

FOREIGN PATENT DOCUMENTS

EP    1 575 225 A2    9/2005

OTHER PUBLICATIONS

International Search Report for PCT Application No. PCT/CA2006/000946, Nov. 8, 2006.

*Primary Examiner*—Charles N Appiah
*Assistant Examiner*—Kiet Doan
(74) *Attorney, Agent, or Firm*—Carlson, Gaskey & Olds

(57) ABSTRACT

A vehicle communication system facilitates hands-free interaction with a mobile device in a vehicle or elsewhere. Users interact with the system by speaking to it. The system processes text and processes commands. The system supports Bluetooth wireless technology for hands-free use. The system handles telephone calls, email, and SMS text messages. The user can customize the device via a user profile stored on an Internet web server.

8 Claims, 2 Drawing Sheets

U.S. PATENT DOCUMENTS

2005/0143134 A1* 6/2005 Harwood et al. ............ 455/563
2006/0030298 A1 2/2006 Burton et al.
2006/0052921 A1 3/2006 Bodin et al.
2006/0089754 A1 4/2006 Mortenson

* cited by examiner

VEHICLE IMMERSIVE COMMUNICATION SYSTEM

The application claims priority to U.S. Provisional Application Ser. Nos. 60/689,959, filed Jun. 13, 2005; 60/729,905, filed Oct. 25, 2005; 60/736,102, filed Nov. 10, 2005; 60/763,660 filed Jan. 31, 2006; 60/777,424 filed Feb. 28, 2006 and 60/803,329 filed May 26, 2006.

BACKGROUND OF THE INVENTION

This invention relates to a system for managing and communicating information while in a vehicle. More specifically, this invention relates to a system that integrates with a cell phone, PDA, or other mobile device to provide hands-free use of phone call, email, text messaging, and other functionality of a mobile device.

Exchanging critical information using email, instant messaging, and other online media is essential to succeed in today's connected lifestyles and business environments. We depend on constant connectivity for important emails, timely updates, and to make sound decisions. Unfortunately, managing this online information on a mobile device or visible screen can be extremely difficult and dangerous while driving.

In order to address these safety hazards, many states have enacted legislation to restrict the use of cell phones and other mobile devices while in the car. In light of this, hands-free devices for cell phones have become increasingly popular. However, many users are still distracted while trying to drive and operate their wireless devices.

An arrangement for safely managing and communicating a variety of information while in a vehicle is needed.

SUMMARY OF THE INVENTION

This invention addresses this need by providing a convenient and safe hands-free interface to manage important online information while enhancing the driving experience. Rather than awkwardly reaching for a handheld device and looking away from the road to read a new email, this invention integrates seamlessly in a vehicle to read important information out loud, directly to the driver. A voice-based interface provides unified access to all communication needs while allowing the driver to focus their attention on the road.

This invention provides a small device that wirelessly interacts directly with mobile devices and vehicle hands-free audio systems or headsets and allows the driver to listen to and manage email, quickly respond to email over the phone, compose SMS messages, and answer and return phone calls. The driver can talk and listen to it, and remain focused on driving and navigation of the vehicle. A built-in intelligent information manager automatically composes appropriate responses while parsing and prioritizing incoming information to ensure that only the most important messages are heard first.

DETAILED DESCRIPTION OF THE PREFERRED EMBODIMENT

Figure 1:
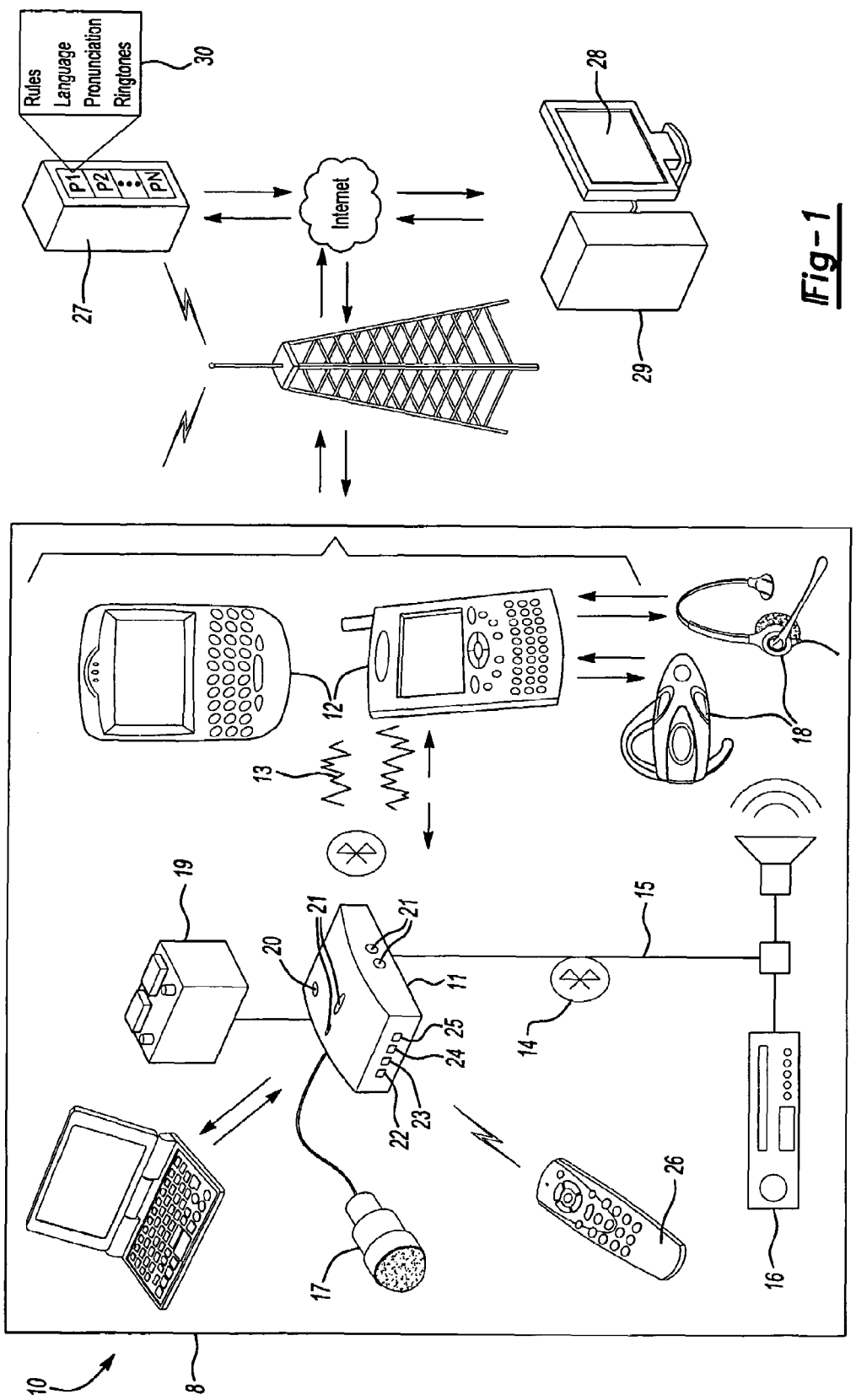
FIG. 1 schematically illustrates a communication system according to one embodiment of the present invention.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile device 12. All data 13 is encrypted prior to transmission. The audio output of the control unit 11 is transmitted either wirelessly 14 or through a direct, wired connection 15 to the vehicle's car stereo 16. The audio input for the control unit 11 is obtained either through a directly connected microphone 17, through an existing vehicle hands-free system, or wirelessly though a headset 18 connected to the mobile device 12.

The control unit 11 connects to the vehicle's battery 19 for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile device 12; and clear all preferences and reset the device to its factory default settings. The control unit 11 also has a set of four status lights 21 which display the following information: power and system health, vehicle connection status and activity, mobile device connection status and activity, and information access and general status.

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8 or on the mobile device 12 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features; and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (i.e. just like connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The driver stores his or her settings for the device in their settings profile 30. This profile 30 may be stored in a database on an Internet server 27. The control unit 11 utilizes the internet access provided by the driver's mobile device 12 to download the driver's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

Figure 2:
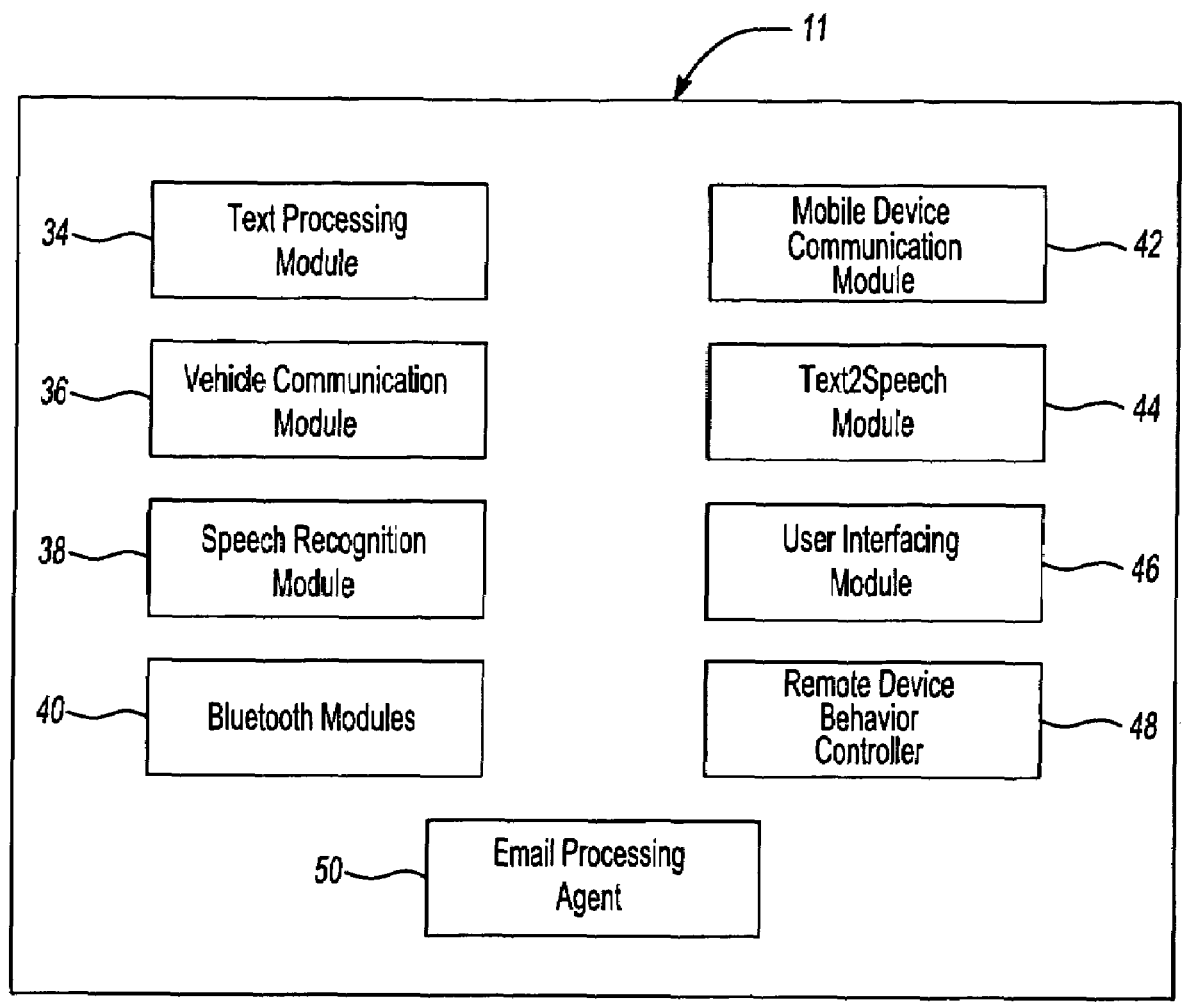
FIG. 2 illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (i.e. 18 r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (i.e. "I'm in the car call me at 'number,'" or "I'm in the car, I will reply as soon as I can"). New emails can also be created and sent as a voice recording in the form of a .wav or .mp3 file. The driver is also provided the option of calling the sender of the email on the phone using existing contact information in the address book, or responding to meeting requests and calendar updates (i.e. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the driver is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (i.e. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (i.e. .wav, .mp3), HTML (i.e. encoded emails and web sites), plain text portions of Word and PowerPoint files, Adobe Portable Document format (PDF), OpenDocument formats, and compressed and/or encoded attachments of the above formats (i.e. zip).

Third, the control unit 11 provides remote access to information. This includes existing news sources (i.e. existing RSS feeds) and supported websites. This also includes subscription to value-added services including: weather, custom alerts (i.e. stock price triggers), traffic conditions, personalized news, e-books (not limited to audio books, but any e-book), personalized audio feeds, and personalized image or video feeds for passengers.

Fourth, the device provides environment and location awareness. This includes current location and navigation information, local weather conditions, vehicle status, and relevant location-specific information (i.e. where is "work", where is "home?").

Personalization

Another feature in the present invention is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (i.e. email addresses and web site URLs) with simple names and words. The driver can also choose to hear only select information when a new email arrives (i.e. just the sender name, or the sender and subject, or a quick summary). Email "ring tones" are also available for incoming emails based on sender or specific keywords. Prepared text or voice replies can be used to send frequently used responses (i.e. "I'm in transit right now"). Some prepared quick-responses may be used to automatically forward an email to a pre-selected recipient such as an administrative assistant. The driver can also set up both email address configuration and multiple email address rules (i.e. use "me@work.com" when replying to emails sent to "me@work.com," but use "me@mobile.com" when composing new emails).

The driver can also customize notification. This includes prioritizing emails and phone calls based on caller or sender and subject (i.e. never read emails from Ben out loud, or if an email arrives from George, it should be read before others). The driver can also limit the amount of notifications received (i.e. set minimum time between notifications, or maximum number of emails read in a short period of time).

Time-sensitive rules in the profile 30 may include options such as "don't bother me in the morning," or "only notify me about incoming email between these hours." The driver can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (i.e. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (i.e. IMS, USB).

Information about specific words or phrases can be used to enhance both speech recognition performance and text-to-speech performance, and this includes context sensitive shortcuts. For example, nicknames should be expanded into an email address if the driver is dictating an email. In addition, email addresses should be expanded to a common name when found. The driver can also set custom voice prompts or greetings.

The device also features multiple user support, wherein multiple people can share the same device. The device automatically identifies each person by their mobile device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The driver could also use the control unit 11 through an advanced wireless audio/visual system, including such features as streaming music and providing image content (i.e. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the driver can expand the functionality of the device by attaching such items as a USB GPRS/EDGE/3G device for direct mobile access without a separate mobile device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (i.e. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (i.e. just like connecting a digital camera or GPS unit directly to a computer).

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle communication system comprising:
   a control unit in a vehicle;
   a mobile communication device having data network access, the mobile communication device having a self-contained mode in which information received via the data network is processed and displayed on the mobile communication device and an immersive mode in which information is received via the data network and the device and processed by the control unit, the mobile communication device automatically switching from self-contained mode to immersive mode based upon a proximity of the device to the control unit; and
   a user profile associated with the mobile device, the control unit processing the information based upon the user profile, wherein the control unit determines when to present the information to the user based upon the user profile, wherein the information includes a plurality of emails, some of which are presented to the user based upon the user profile, and wherein the user profile includes criteria based upon which the control unit automatically replies to a subset of the plurality of emails without presenting them to the user.

2. The system of claim 1 wherein the mobile device switches modes based upon establishment of communication between the mobile device and the control unit.

3. The system of claim 1, wherein the mobile device switches modes based upon one of the control unit and the mobile device detecting the presence of the other of the control unit and the mobile device.

4. The system of claim 1, wherein the information includes a plurality of emails and wherein the control unit converts text in the plurality of emails to audible speech and plays the audible speech in the vehicle.

5. The system of claim 4 further including a microphone receiving voice commands from a user, the control unit processing the voice commands and playing the audible speech based upon the voice commands.

6. The system of claim 1, wherein the control unit selects the user profile based upon an identification of the mobile device associated with the profile.

7. The system of claim 1, wherein a plurality of profiles, including the user profile, are stored on a server accessible via the internet and wherein the user profile can be modified by the user on the server via the internet, the control unit downloading the user profile from the server via the data network access of the mobile device.

8. The system of claim 1, wherein the mobile device also has voice network access and wherein voice calls handled by the mobile device in immersive communication mode are played through at least one speaker connected via the control unit.

* * * * *